Nov. 17, 1959  R. STEVENSON  2,913,289
BALL BEARING AND SEAL
Filed April 19, 1956
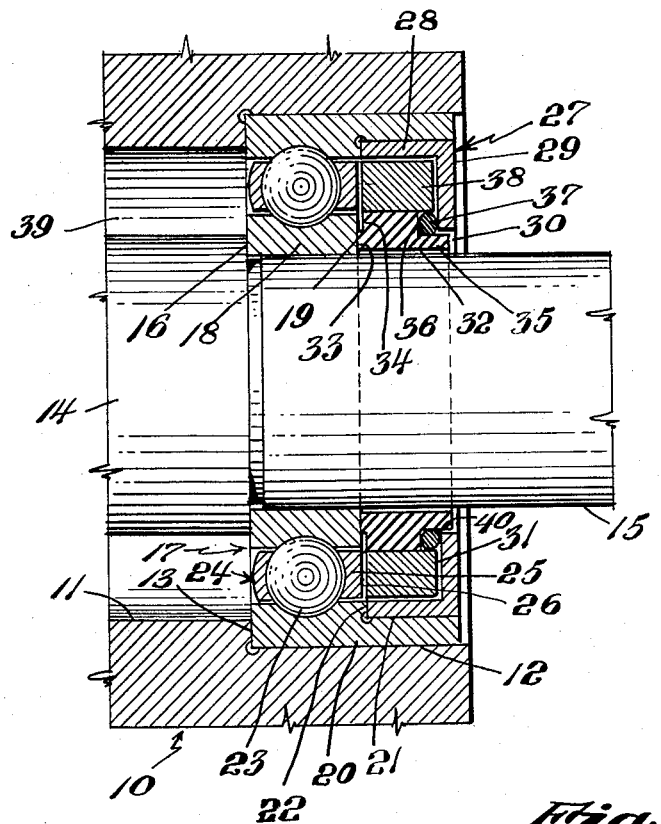
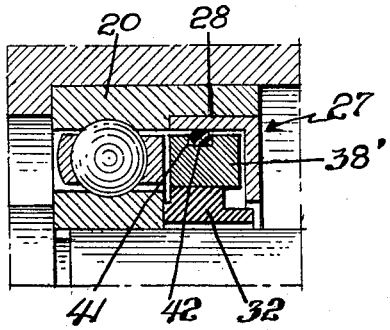
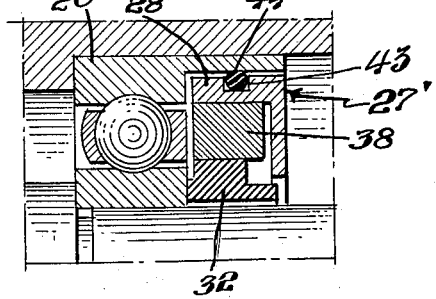
INVENTOR.
Robert Stevenson
BY
Barlow & Barlow
ATTORNEYS.

United States Patent Office 2,913,289
Patented Nov. 17, 1959

2,913,289

BALL BEARING AND SEAL

Robert Stevenson, Barrington, R.I., assignor to Magnetic Seal Corp., a corporation of Rhode Island Application April 19, 1956, Serial No. 579,249

8 Claims. (Cl. 308—187.1)

This invention relates to a combined rotary seal and anti-friction bearing.

An object of this invention is to provide a unit which may be assembled with a casing, which unit will provide both a seal and a bearing for a shaft which may extend from the casing.

Another object of the invention is to provide for the functioning of both a ball bearing and a seal by utilization of some parts which are common to the two.

Another object of the invention is to provide a combined ball bearing and seal construction which may be made of short axial length.

With these and other objects in view, the invention consists of certain novel features of construction as will be more fully described and particularly pointed out in the appended claims.

In the accompanying drawing:

Figure 1 is a sectional view of a combined bearing and seal, showing one embodiment of this invention;

Figure 2 is a sectional view of a modified form of seal, showing another embodiment of this invention.

Figure 3 is a sectional view of a different modified form of seal.

In carrying out this invention, I have utilized either a part of the raceway of the ball bearing or a part to which the ball bearing is secured as a means for housing a sealing unit by the extension of this part beyond what would normally be required for the use of the ball bearing alone, and I have also provided a sealing face on a sleeve, which carries a magnet, by reason of which the axial length of the combined parts may be minimized. An O-ring is assembled with the magnet in such a way that the sleeve carrying the sealing face may move axially to accomplish the sealing function and may rock sufficiently to provide desired alignment of the sealing face.

Referring to the drawing for a more detailed description of the invention, 10 designates generally a housing provided with two different size coaxial bores 11 and 12 which form a shoulder 13 between them. A shaft 14 projects through the bores and has a reduced portion 15 which forms a shoulder 16 located in the plane of shoulder 13. The shaft is journalled in an anti-friction bearing 17 of the ball bearing type having an inner race 18 which is received on the reduced shaft portion 15 to engage against the shoulder 16. The inner race 18 is frictionally held on the shaft to rotate therewith and the end surface 19 is lapped finished so as to provide a sealing surface. The outer race 20 of the bearing is received in the bore portion 12 and abuts against shoulder 13 and is held stationary relative to the wall of bore 12 by means of a press fit therewith. The outer race has a counterbored portion 21, the inner end of which forms an inner annular shoulder 22.

Each race 18, 20 has the usual annular recess in which the bearing balls 23 seat and which are maintained in proper spaced relation by a cage 24, one side of which in the present instance is in the form of an annulus 25 having the outer side 26 thereof extending in line with the surface 19 of the inner race.

A cup-like element or cap 27 having a circular wall 28 and an end wall 29 provided with a central bore 30 is received in the counterbore 21 to abut against the shoulder 22. The cap 27 has a press fit relation with the wall of the counterbore 21. The wall 29 extends substantially flush with the end of the outer race 20. Thus, there is formed an annular chamber 31 in the space between the surface 19 and the wall 29. The cap 27 is made of non-magnetic material, preferably a stainless steel material.

A carbon sleeve 32 is slidably received on the reduced shaft portion 15 at a location thereon within chamber 31 and has a diameter equal to the diameter of the inner race 18 and a lip 33 projecting from the side 34 thereof into engagement with the surface 19. The other end portion of the sleeve is reduced in diameter as at 35, which reduced portion projects through the bore 30. The reduced portion 35 forms a shoulder 36 at a location opposite to the wall 29 and spaced therefrom. An O-ring seal 37 is positioned in the space between the shoulder 35 and wall 29 and seals the chamber 31 at the O-ring while permitting axial movement of the sleeve into sealing engagement and rocking for perfect alignment of the sealing faces.

A ring type magnet 38 has a diameter substantially equal to the diameter of the annulus 25 and is mounted on the sleeve 32, being secured thereto as by a press fit. The inner end of the magnet 38 extends flush with the side 34, which spaces the magnet from the annulus 25 the distance the lip projects from the side 34 of the sleeve 32. The other end of the magnet overhangs the reduced portion 35 and is engaged by the O-ring 37. Sufficient clearance about the magnet is provided for movement of the sleeve as above mentioned. The magnet 38 is made of any suitable material which is capable of being magnetized, preferably "Alnico" magnetizable material, and is magnetized across the diameter with a north pole at one location on the periphery and a south pole diametrically opposite and with other lines of force extending parallel thereto which provides the maximum length of lines of force.

The carbon sleeve 32 is loose on the shaft portion 15. The magnet 38 is at a position opposite to the annulus 25, which is of a material to be attracted by the magnet thus these or other parts of the ball bearing will cooperate magnetically to draw the sleeve along the shaft to engage the lip 33 with the inner race. Thus, the chamber 31 will be sealed against the escape of lubricant at the lip 33 and O-ring 37.

Assuming that the greater fluid pressure exists in the chamber 39, this pressure will be transmitted through the ball bearing and be applied on face 34 of the carbon seal and along the face of the magnet 38 and also be transmitted around the magnet to its opposite side to be applied on the O-ring 37. This pressure, depending upon its amount, will squeeze the O-ring radially inwardly and also transmit pressure of the O-ring on the inside of the wall 29 and also along the radial surface 36 and also on the outer cylindrical surface of the portion 35 at 40. Inasmuch as the diameter of the surface 40 and the outer diameter of the sealing lip 33 are substantially the same, or possibly the surface 40 is slightly less than the outer diameter of the face 33, the pressure on the carbon ring will be substantially balanced or slightly forced toward sealing position and against the face 19. However, the O-ring 37 will always be under some compression and will force the carbon ring 32 toward sealing engagement.

In the showing of Figure 2 the magnet 38' at its outer periphery is grooved as at 41 to receive the O-ring 42 which prevents the passage of fluid at this location along the wall 28 instead of as shown in Figure 1 while also permitting axial movement of the magnet and carbon ring 32 relative to the cap 27 and alignment of the sealing faces.

In Figure 3 the magnet 38 and its sleeve 32 are firmly secured to the cap 27', and this cap 27' has the outer surface of its wall 28' grooved at 43 to receive an O-ring 44 which prevents passage of fluid along the wall 28' between it and the inner surface of the race 20 while permitting axial movement of the unit cap 27', magnet 38, and carbon ring 32 and alignment of the sealing faces.

I claim:

1. In combination with a ball bearing having one ball race provided with a sealing surface, a rotatable sleeve held against rotation relative to the other ball race and having a sealing surface thereon projecting into sealing engagement with said first sealing surface, and magnet means carried by said sleeve co-operating magnetically with said bearing for axially urging said sealing surfaces into engagement.

2. In combination according to claim 1 wherein the first said ball race is the inner ball race of the bearing.

3. In combination according to claim 1 wherein said magnetic means is a ring type magnet carried by said sleeve.

4. A ball bearing and seal for a rotating shaft comprising a shell provided with an outer ball race having a fixed relation thereto, an inner ball race for rotation with a shaft provided with an annular sealing face thereon, balls between said inner and outer races, a sleeve for slidable mounting on said shaft having an annular sealing face for engagement with the first said sealing face, a magnet carried by and displaced radially of said sleeve and co-operating with said ball bearing to urge said sleeve into sealing engagement.

5. A bearing and seal unit comprising inner and outer ball races, a ball cage between said ball races, said inner race being provided with a sealing surface, a rotatable sleeve held against rotation relative to the outer ball race and having a sealing surface thereon projecting into sealing engagement with said first sealing surface, and a ring type magnet carried by said sleeve at a location radially outwardly of said sleeve and opposite to said cage, said magnet and said cage co-operating magnetically to maintain said inner race and said sleeve in sealing relation.

6. A ball bearing and seal for a rotating shaft comprising a stationary housing having an annular bore, a shaft extending therethrough, said bearing having an inner ball race mounted on said shaft provided with a sealing surface thereon, an outer ball race received in said bore and secured to the wall thereof, a ball cage between said races, a sleeve slidably mounted on said shaft and having a sealing surface projecting into engagement with said first sealing surface, a ring type magnet carried by said sleeve and located radially outwardly of said sleeve and opposite to said cage, said magnet and said cage co-operating magnetically to maintain said sleeve and said inner race in sealing relation.

7. A ball bearing and seal for a rotating shaft comprising a shell provided with an outer ball race having a fixed relation thereto, an inner ball race for rotation with a shaft provided with an annular sealing face thereon, balls between said inner and outer races, a sleeve for slidable mounting on said shaft having an annular sealing face for engagement with the first said sealing face, a magnet carried by said sleeve and co-operating with said ball bearing to urge said sleeve into sealing engagement, said magnet being sealed to said shell by a resilient O-ring permitting aligning of said magnet and sleeve.

8. A ball bearing and seal for a rotating shaft comprising a stationary housing having an annular bore, a shaft extending therethrough, said bearing having an inner ball race mounted on said shaft provided with a sealing surface thereon, an outer ball race received in said bore and secured to the wall thereof, a ball cage between said races, a sleeve slidably mounted on said shaft and having a sealing surface projecting into engagement with said first sealing surface, a ring type magnet carried by said sleeve and extending opposite to said cage, said magnet and said cage co-operating magnetically to maintain said sleeve and said inner race in sealing relation, said magnet being sealed to said housing by a resilient O-ring permitting aligning of said magnet and sleeve.

References Cited in the file of this patent

UNITED STATES PATENTS

| 2,189,685 | Stevenson | Feb. 6, 1940 |
| 2,554,595 | Smith | May 29, 1951 |

FOREIGN PATENTS

| 678,981 | Great Britain | Sept. 10, 1952 |